United States Patent [19]

Hamane

[11] Patent Number: 4,582,158
[45] Date of Patent: Apr. 15, 1986

[54] MOTORCYCLE ENGINE COOLING SYSTEM

[75] Inventor: Masumi Hamane, Saitama, Japan

[73] Assignee: Honda Giken Kogyo Kabushiki Kaisha, Tokyo, Japan

[21] Appl. No.: 530,852

[22] Filed: Sep. 9, 1983

[30] Foreign Application Priority Data

Sep. 11, 1982 [JP] Japan ................. 57-158379

[51] Int. Cl.⁴ ............... B60K 11/04; B62M 7/06
[52] U.S. Cl. .......................... 180/229; 180/68.1
[58] Field of Search .......... 180/229, 219, 225, 226, 180/228, 230, 68.1; 165/41, 44, 51, 53, 54

[56] References Cited

U.S. PATENT DOCUMENTS 2,792,899  5/1957  Piatti .................... 180/229
4,237,996 12/1980  Matsuda ................. 180/229
4,445,587  5/1984  Hillman ................. 180/229

FOREIGN PATENT DOCUMENTS 956384 12/1956 Fed. Rep. of Germany ...... 180/226

Primary Examiner—John A. Pekar
Attorney, Agent, or Firm—Lyon & Lyon

[57] ABSTRACT

An engine cooling system for a small motorcycle employing a radiator mounted compactly in the vacant space in front of a water-cooled engine. The radiator and engine are located and protected in the rear body of the motorcycle. The rear body prevents the radiator from being damaged by objects picked up from the roadway. Outlet openings at the rear of the rear body aid in the flow of air through the radiator, passed the engine and from the engine compartment.

3 Claims, 3 Drawing Figures

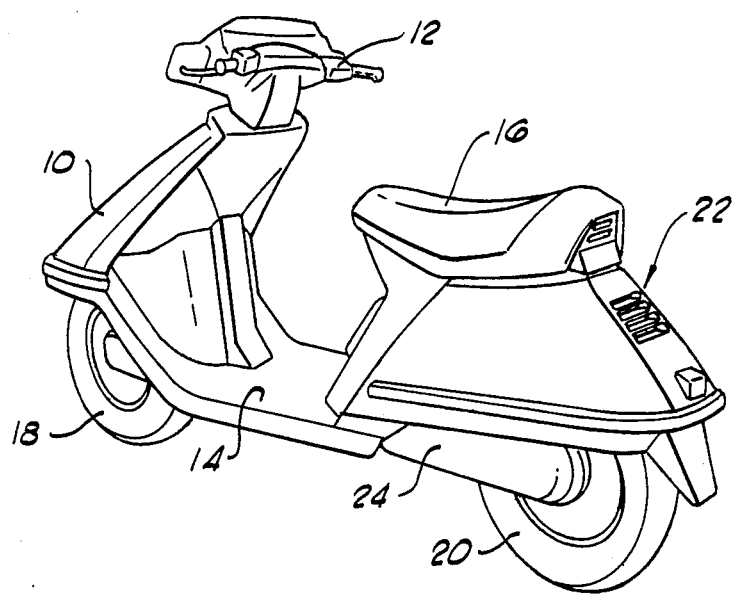
Fig. 1.
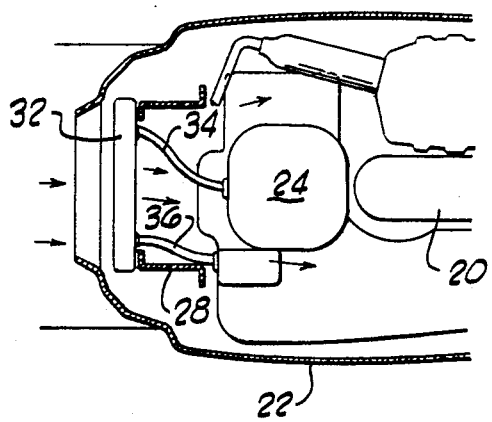
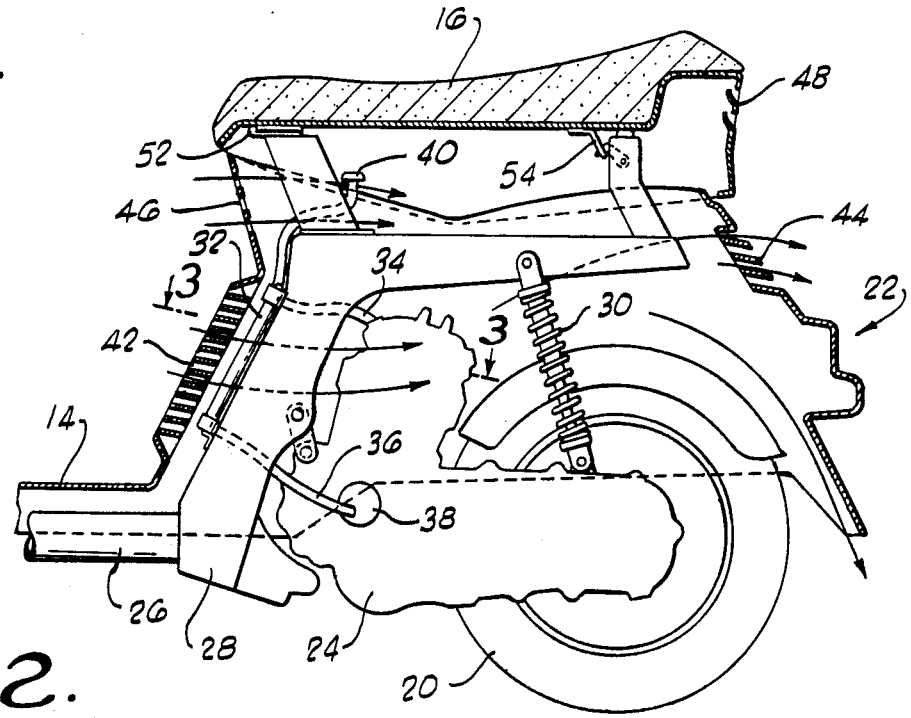
Fig. 3.
Fig. 2.

MOTORCYCLE ENGINE COOLING SYSTEM

BACKGROUND OF THE INVENTION

The field of the present invention is engine cooling systems for motorcycles and particularly water-cooled systems for scooter type motorcycles.

Motorcycles and particularly small motorcycles have typically employed air cooling systems because of the lighter weight and compact nature of such systems in comparison to water cooled systems. Air cooling eliminates the necessity of the cooling fluid, the radiator, the water pump, the water jacket at the engine and the necessary tubing. However, water cooling generally provides a more efficient cooling medium than air and thereby a more constant engine operating temperature and reduced noise.

Water-cooled engines, in requiring a radiator, further require ducting for air flow to the radiator and then from the vehicle. As a result, compactness is forfeited, a major consideration in small motorcycle design. The use of radiators in such small motorcycles has also detracted from their use because location of the radiator in front of typical mid-body engines exposes the radiator to damage from objects picked up from the roadway. Placing the radiator away from the engine in a less vulunerable location requires extensive use of piping between the radiator and the engine.

SUMMARY OF THE INVENTION

The present invention pertains to a water-cooled engine cooling system for a motorcycle of the type having a rear body containing a rear mounted engine. The radiator is compactly placed in the vacant space ahead of the engine under the rear body. An inlet opening in the front of the rear body allows air to flow through the radiator and the engine. The air is then exhausted through an outlet opening in the rear of the body.

The employment of a water-cooled engine having a radiator positioned ahead of the engine and within the rear body protects the radiator from being damaged by objects picked up from the roadway. The proximity of the radiator to the engine reduces the amount of piping between the radiator and the engine to a minimum. The location of the radiator near the middle of the vehicle also aids in the distribution of the weight to both front and rear wheels.

Accordingly, it is a principal object of the present invention to provide a water-cooled system for the engine of a small motorcycle with the radiator thereof advantageously located. Other and further objects and advantages will appear hereinafter.

BRIEF DESCRIPTION OF THE DRAWING

FIG. 1 is an oblique view of a motorcycle of the present invention.

FIG. 2 is a side elevation of a portion of the motorcyle of FIG. 1 illustrated in cross section.

FIG. 3 is a cross-sectional detail taken along line 3—3 of FIG. 2.

DETAILED DESCRIPTION OF THE PREFERRED EMBODIMENT

Turning in detail to the drawing, a motorcycle of the scooter type is illustrated with a water-cooled engine. The motorcycle includes a front leg shield 10, a steering and handle grip assembly 12, a step floor 14, a seat 16 and front and rear wheels 18 and 20. The seat is supported upon a rear body 22 which also encloses an engine and drive train assembly 24.

The frame of the motorcycle includes a rearwardly extending down tube 26 which is fixed to a rear frame member 28. The rear frame member 28 extends upwardly within the rear body 22 and then rearwardly. The rearward extension of the rear frame 28 supports the seat 16 and forms a base for supporting cushion assemblies 30.

A water cooling system, which may employ water, conventional coolant or other coolant fluids is contained within the rear body 22. A radiator 32 is positioned forwardly of the engine 24 on the rear frame 28. Extending between the radiator 32 and the jacketed engine 24 are tubes 34 and 36 for conveying cooling fluid therebetween. A water pump 38 induces circulation through the system. A filler cap assembly 40 extends upwardly from the radiator 32 to a convenient access location beneath the seat 16.

Air flow to the radiator 32 and to the engine 24 is provided through a louvered inlet opening 42 located at the forward portion of the rear body 22. As depicted by the arrows in FIG. 2, air flows through the opening 42, through the radiator 32 and by the engine 24. The air particularly passes the head of the engine 24 while other air from beneath the vehicle circulates passed the lower portion of the engine and drive train assembly 24.

Once having passed through the radiator 32 and passed the head of the engine 24, the air is directed rearwardly to and through a louvered outlet opening 44 located at the back of the rear body 22. The opening 44 is advantageously located at an area of lowered pressure when the vehicle is moving forward. Thus, additional air flow through the rear body 22 is experienced. Additional air flow is allowed to pass around and over the wheel 20 to be directed downwardly and out the bottom of the rear body 22. Additional venting inlet holes 46 are provided at the upper portion of the front area of the rear body 22. These holes allow air passage beneath the seat in the upper area of the engine compartment. Vent outlet openings 48 help to exhaust air from this upper portion.

To provide easy access to the radiator and particularly the filler cap assembly 40, a hinge 52 is provided as a means for mounting the seat 16 along with a latch assembly 54 in order that the seat may be raised for access into the engine compartment.

Efficient cooling is thereby achieved through the location of the radiator 32 adjacent and immediately behind the inlet opening 42. This area is also a vacant area between the front wall portion of the rear body 22 and the engine 24 and thereby used without compromising the compact motorcycle design.

Thus, a motorcycle is disclosed of the type having a rear body employing an advantageously located radiator as part of a water-cooled cooling system. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A motorcycle having a rear body containing a rear mounted engine, comprising a radiator mounted in the rear body in front of the engine;

inlet openings in the front of the rear body immediately in front of said radiator;

inlet openings in the upper portion of the frontal area of the rear body above said radiator to provide air flow into the upper area of the interior of the rear body; and outlet openings at the upper portion of the rear body for venting the rear body.

2. A motorcycle having a rear body containing a rear mounted engine, comprising a radiator mounted in the rear body in front of the engine;

inlet openings in the front of the rear body immediately in front of said radiator; and outlet openings at the rear of the rear body.

3. A motorcycle having a rear body containing a rear mounted engine, comprising a radiator mounted in the rear body in front of the engine;

inlet openings in the front of the rear body immediately in front of said radiator; and a filler cap assembly on said radiator, said filler cap assembly extending from said radiator to a location beneath a seat.

* * * * *